(12) United States Patent
Goldberg (10) Patent No.: US 8,570,433 B1
(45) Date of Patent: Oct. 29, 2013

(54) COLORATION ARTIFACT REDUCTION

(75) Inventor: Paul R. Goldberg, Palo Alto, CA (US)

(73) Assignee: CSR Technology, Inc., Sunnyvale, CA (US)

( * ) Notice: Subject to any disclaimer, the term of this patent is extended or adjusted under 35 U.S.C. 154(b) by 169 days.

(21) Appl. No.: 13/217,003

(22) Filed: Aug. 24, 2011

Related U.S. Application Data

(60) Provisional application No. 61/376,794, filed on Aug. 25, 2010.

(51) Int. Cl.
*H04N 5/222* (2006.01)

(52) U.S. Cl.
USPC ............. 348/371; 348/222.1; 348/224.1

(58) Field of Classification Search
USPC ............ 348/222.1, 224.1, 241, 371; 382/167, 382/275
See application file for complete search history.

(56) References Cited

U.S. PATENT DOCUMENTS

| | | | |
|---|---|---|---|
| 6,407,777 B1 | 6/2002 | DeLuca | |
| 7,450,756 B2 | 11/2008 | Bloom et al. | |
| 7,557,817 B2 | 7/2009 | Soroushi et al. | |
| 7,599,577 B2 | 10/2009 | Ciuc et al. | |
| 2005/0094895 A1* | 5/2005 | Baron | 348/224.1 |
| 2006/0132642 A1 | 6/2006 | Hosaka et al. | |
| 2006/0245643 A1* | 11/2006 | Bloom et al. | 382/167 |
| 2007/0116380 A1* | 5/2007 | Ciuc et al. | 382/275 |
| 2010/0194919 A1* | 8/2010 | Ishii et al. | 348/224.1 |

FOREIGN PATENT DOCUMENTS

WO WO-2010081010 A2 7/2010

OTHER PUBLICATIONS

Krishnan et al. "Dark Flash Photography," Dept. of Comuter Science, Courant Institute, New York University, Published in Proceedings, SIGGRAPH 2009, New Orleans, Aug. 2009.

* cited by examiner

*Primary Examiner* — Gevell Selby
(74) *Attorney, Agent, or Firm* — Perkins Coie LLP (57) ABSTRACT

Techniques for reducing coloration artifacts visible in digital images acquired under flash lighting conditions are provided. The coloration artifact problem is addressed by capturing two images of the scene, a first image illuminated by a limited spectral bandwidth flash light source, and a second image illuminated by broad spectral bandwidth flash light source. Pixels of the second image are replaced with selected counterpart pixels from the first image that do not contain the coloration artifact.

41 Claims, 6 Drawing Sheets

COLORATION ARTIFACT REDUCTION

CROSS-REFERENCE TO RELATED APPLICATIONS

This application claims priority under 35 U.S.C. §119(e) to U.S. Provisional Application Ser. No. 61/376,794 of P. Goldberg, entitled "Coloration Artifact Reduction" and filed on Aug. 25, 2010, which is expressly incorporated by reference herein in its entirety.

BACKGROUND

1. Field of the Invention

This invention relates to the acquisition and processing of images that display coloration artifacts precipitated by the use of flash illumination. More particularly it relates to a system and method for the image acquisition and processing of an image acquired with the use of a flash illumination source incorporated in a digital image capture device, such as a consumer oriented digital camera or mobile phone.

2. Discussion of Related Art

Coloration artifacts are sometimes displayed in images that have been acquired by the use of flash illumination. For example, in an image acquired by a small form factor digital camera or mobile phone, both equipped with built-in flash mechanisms, the conversion to red of the normally black pupils of a human subject's eyes, when the subject's face is illuminated by flash light, is a common occurrence. A similar coloration artifact, but usually of a color other than red, occurs when a pet subject's face, such as the face of a dog or a cat, is illuminated by a flash light. In the case of a dog, the black pupils of the subject's eyes are sometimes rendered as being yellow in color. In the case of a cat, the black pupils of the subject's eyes are sometimes rendered as being green in color. These particular coloration aberrations are a challenge to resolve because they are caused by the direct reflection of the flash light from the retinas of the subject's eyes.

Coloration artifacts such as those described above, can be reduced by diffusing the light emitted from the digital camera's built-in flash light source, and/or by redirecting the camera's flash light such that it indirectly illuminates the subject's face. However, these approaches require that the built-in illumination source be able to be moved relative to the axis of the camera's lens, be fitted with a light diffusing or redirecting elements, or both. This strategy is inconvenient, unreliable, and costly. Some digital cameras attempt to reduce the artifact by using multiple illumination source flashes. These flashes can close the irises of the subject's eyes, and reduce the light reflected back toward the camera from the subject's retinas, before the flash employed for the actual capture of the image is initiated. Again, this strategy is often not reliable. A third method uses image processing techniques for reducing the appearance of unwanted coloration artifacts. These locate the image color areas that correspond to predefined image area shape and color parameters, and modify the color of these areas so as to produce more acceptable image color characteristics. These techniques can be implemented within the camera taking the picture, or executed as a post process on a separate processing device. They have the downside of creating color corrected image areas that often do not look "real". In other words, the color corrected pupils of the subject fail to display the subtle, detailed, reflections seen when directly viewing the eyes of a human or pet.

Thus there exists a need for an in-camera method and apparatus that can mitigate coloration artifacts precipitated by the use of flash illumination, that is reliable, low in cost, and produces captured images of superior quality.

SUMMARY

It is therefore desirable to effect a method of capturing and processing an image of a scene with one or more objects that generates an image with reduced image coloration artifacts.

To achieve this objective the techniques introduced here can be implemented in a digital image capture device, such as a digital camera. In one embodiment the techniques introduced here include a method that comprises capturing a first image of a scene, where the first image is formed of a first plurality of pixels that have values that correspond to reflections of flash illumination within a predetermined spectrum of electromagnetic energy, but that do not correspond to reflections of flash illumination within a portion of the predetermined spectrum. The method further comprises capturing a second image of the scene, where the second image is formed of a second plurality of pixels having values that correspond to reflections of flash illumination within the predetermined spectrum of electromagnetic energy including said portion of the predetermined spectrum. The method further comprises correcting for a flash-induced coloration artifact in the second image by generating an output image in which only selected pixels of the second image are replaced with counterpart pixels from the first image.

In various embodiments, the predetermined spectrum may be, for example, the light spectrum that is naturally visible to humans (the "human-visible spectrum"), including wavelengths between 570 nm and 750 nm. The above-mentioned portion of the predetermined spectrum (i.e., the portion that is excluded from the first image) may be, for example, all wavelengths between approximately 570 nm and approximately 750 nm (red); or all wavelengths between approximately 495 nm and approximately 750 nm (red and green); or all wavelengths between approximately 380 nm and approximately 495 nm (blue) and between approximately 570 nm and approximately 750 nm (red).

A first specific embodiment captures two images of the scene. The first image of the scene uses a first spectral bandwidth flash light illumination source to illuminate the scene during image capture, and the second image of the scene uses a second spectral bandwidth flash light illumination source to illuminate the scene during image capture. The reduced coloration artifact image is generated by replacing selected image pixels of the second image with their counterpart pixels from the first image. When capturing a scene with human faces, for example, a first spectral bandwidth flash light source containing wavelengths from only the blue and/or the green portions of the human-visible spectrum, and a second spectral bandwidth flash light source containing wavelengths from the red, green and blue portions of the visible spectrum, would be preferred choices. This choice of spectral bandwidths for the first and second flash illumination sources will cause red reflections from the retinas of the eyes of human subjects in the scene to be black in color in the first image and red in color in the second image. By replacing the pupil pixels in the second image with those of the first image, the undesirable red retinal reflections that cause normally black human pupils to appear red can be effectively eliminated.

The first specific embodiment may use various flash light sources to illuminate the scene being captured. For example, the first spectral bandwidth flash light source could employ one or more narrow band Light Emitting Diodes (LEDs), or a gas discharge lamp, filtered to remove unwanted spectral energy bands. For the second spectral bandwidth flash light source, a combination of red, green and blue LEDs flashed simultaneously, one or more white LEDs, or an unfiltered gas discharge lamp filled with a gas such as xenon, that radiates light from all portions of the visible light spectrum in its ionized state, in other words white light, can be used.

A second specific embodiment also reduces coloration artifacts by capturing and processing two images of a scene. However, in this second embodiment a flash light source that emits red, green and blue light is used to capture both the first and second images. When capturing a scene with human faces, for example, the first image of the scene is captured through a spectrally selective optical filter that passes only the blue and/or green light portions of the visible spectrum. It blocks out the red light reflected from the scene before it impinges on the image sensor of a digital image capture device. For the second image, the filter is removed or disabled, so that the second image is captured using all the colors reflected from the scene. As in the case of the first embodiment, an image with reduced image coloration artifacts is generated by replacing second image pixels of the second image with selected counterpart, coloration artifact reduced, first image pixels from the first image.

Both specific embodiments can be incorporated within any of various types of digital cameras, any of which may be a self-contained device or a component within another consumer device such as a mobile phone. A digital camera implementation of the first embodiment includes two flash light sources, a first flash light source to produce a first spectral bandwidth illumination for capturing a first image of a scene, and a second flash light source to a produce a second spectral bandwidth illumination for capturing a second image of the scene. A controller is incorporated into the digital camera to cause the first image of the scene to be captured employing the first flash light source, and the second image of the scene to be captured employing the second flash light source. The digital camera includes an image processor to replace second image pixels of the second image with selected counterpart first image pixels from the first image, and thus generate an image with reduced image coloration artifacts.

A digital camera implementation of the second specific embodiment can include a single flash light source that emits red, green and blue light to capture both a first and a second image of a scene. A spectrally selective optical filter is incorporated in the optical path of the digital camera's lens, so that light reflected from the scene passes through the filter before it impinges on the digital camera's image sensor. The filter is mounted so that it can be enabled and disabled, thereby allowing the first image to be captured through the filter and the second image to be captured with the filter effectively out of the optical path of the lens. A controller is included to cause the first image of a scene to be captured when the spectrally selective optical filter is enabled, and the second image of the scene to be captured when the spectrally selective optical filter is disabled. The digital camera incorporates an image processor to replace second image pixels of the second image with selected counterpart first image pixels from the first image, and thus generate an image with reduced image coloration artifacts.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The present invention will now be described more fully hereinafter with reference to the accompanying drawings, which form a part thereof, and which show, by way of illustration, a specific embodiment by which the invention may be practiced. The invention may, however, be embodied in many different forms and should not be construed as limited to the embodiment set forth herein; rather, this embodiment is provided so that this disclosure will be thorough and complete, and will fully convey the scope of the invention to those skilled in the art. Among other things, the present invention may be embodied as methods or devices. Accordingly, the present invention may take the form of an entirely hardware embodiment in the form of modules or circuits, and entirely software embodiment in the form of software executed on a general purpose microprocessor, an application specific microprocessor processor, a general purpose digital signal processor or an application specific digital signal processor, or an embodiment combining software and hardware aspects. Thus, in the following description, the terms "circuit" and "module" will be used interchangeably to indicate a processing element that executes an operation on a input signal and provides an output signal therefrom regardless of the hardware or software form of its implementation. Likewise, the terms "register", "registration", "align" and "alignment" will be used interchangeably to indicate the process of causing like objects to correspond one to another, and be in correct adjustment, regardless if the mechanism employed to bring about such correspondence is implemented in the form of hardware or software. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or", unless the context clearly dictates otherwise. The term "based on" is not exclusive and allows for being based on additional factors not described, unless the context clearly dictates otherwise. In addition, throughout the specification, the meaning of "a", "an", "and" and "the" include plural references. The meaning of "in" includes "in" and "on". Also, the use of "including", "comprising", "having", "containing", "involving", and variations thereof herein, is meant to encompass the items listed thereafter, and equivalents thereof, as well as additional items.

Figure 1:
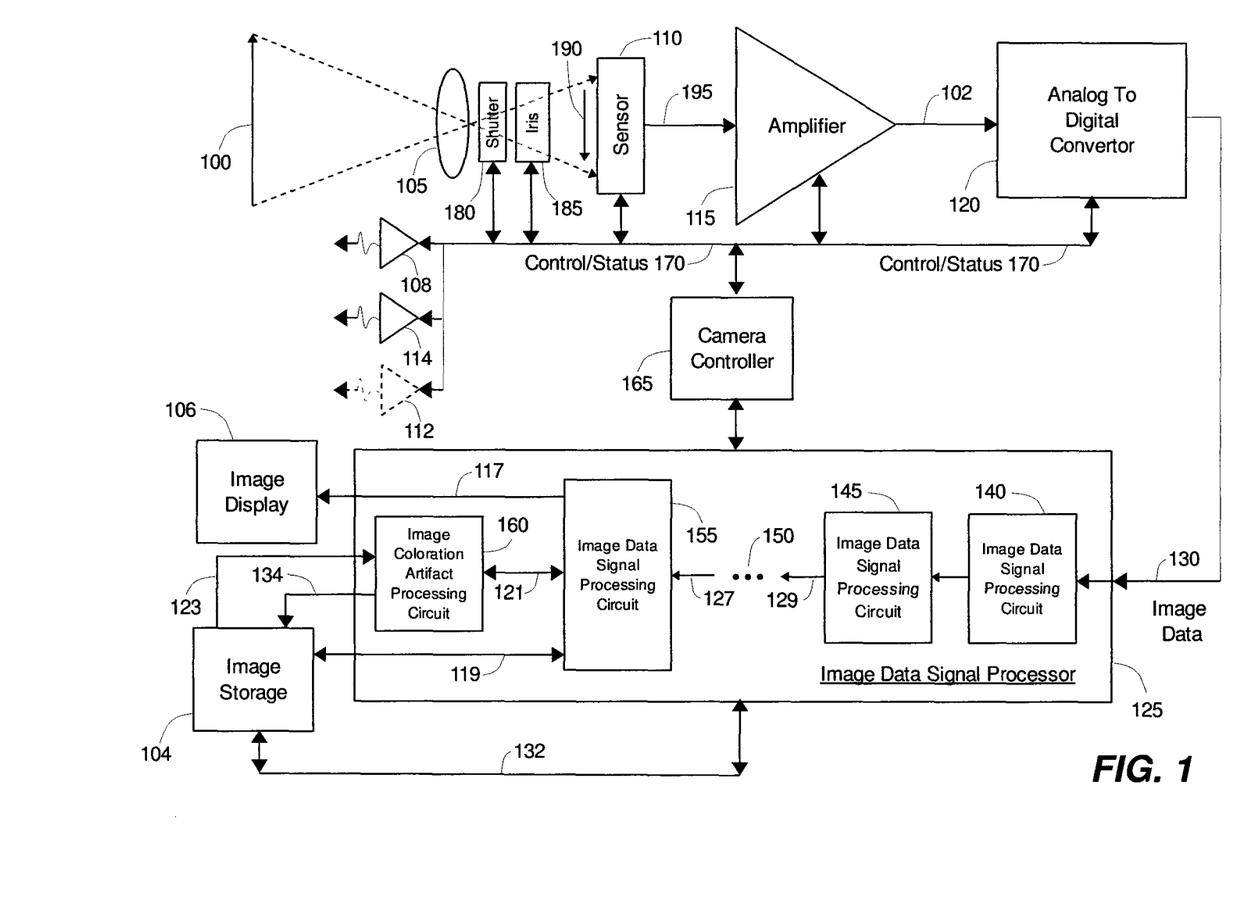
FIG. 1 is a block diagram of a digital camera or other image capture apparatus incorporating a first embodiment of the present invention.

FIG. 1 shows a digital camera or other image capture apparatus which includes an Imaging Optical System 105, an Electronically Controlled Shutter 180, an Electronically Controlled Lens iris 185, an Optical Image Sensor 110, an Analog Amplifier 115, an Analog to Digital converter 120, an Image Data Signal Processor 125, an Image Data Storage Unit 104, an Image Display 106, and Camera Controller 165. The Image Data Storage unit could be a memory card or an internal nonvolatile memory. Data of images captured by the camera may be stored on the Image Data Storage Unit 104. In this embodiment, it may also include internal volatile memory for temporary image data storage and intermediate image processing results. As indicated by line 132, this volatile memory can be distributed among the individual image data processing circuits and need not be architecturally located in a single image data storage unit such as Image Data Storage Unit 104. The Optical System 105 can be a single lens, as shown, but will normally be a set of lenses. An Image 190 of a Scene 100 is formed in visible optical radiation onto a two-dimensional surface of an image sensor 110. An electrical output 195 of the sensor carries an analog signal resulting from scanning individual photo-detectors of the surface of the Sensor 110 onto which the Image 190 is projected. Signals proportional to the intensity of light striking the individual photo-detectors are obtained in the output 195. The analog signal 195 is applied through an Amplifier 115 to an Analog to Digital Converter 120 by means of amplifier output 102. Analog to Digital converter 120 generates a digital image data signal from the analog signal at its input and, through output 130, applies it to Image Data Signal Processor 125. The photo-detectors of the Sensor 110 typically detect the intensity of the light striking each photo detector element in one of two or more individual color components. Although early detectors detected only two separate color of the image, detection of three primary colors, such as red, green and blue (RGB), is now common. As will be seen, the ability to detect multiple wavelengths of light over the visible light spectrum is an essential element of the present invention. Image sensors that detect more than three color components are becoming available.

Multiple processing operations are performed on the image data signal from Analog to Digital Converter 120 by Image Data Signal Processor 125. Processing of the image data signal, in this embodiment, is shown in FIG. 1 as being effected by multiple image data signal processing circuits within Image Data Signal Processor 125. However, these circuits can be implemented by a single integrated circuit image data signal processor chip that may include a general purpose processor that executes algorithmic operations defined by stored firmware, multiple general purposed processors that execute algorithmic operations defined by stored firmware, or dedicated processing logic circuits as shown. Additionally, these operations may be implemented by several integrated circuit chips connected together, but a single chip is preferred. FIG. 1 depicts the use of individual image data signal processing circuits 140 and 145, and multiple image data signal processing circuits 150, connected in series to effect multiple algorithmic processing operations on the image data signal from Analog to Digital Converter 120. The result of these operations is input to image data signal processing circuit 155 which performs final image data processing for image viewing on image display 106, or an external display device, not shown, and nonvolatile image storage in storage module 104. This viewing can be effected either by the physical removal of a memory card from the digital camera and the reinsertion of this card into an external display device, or the electronic communication of the digital camera with an external display device by the use of a Universal Serial Bus (USB) connection, or a Wi-Fi or Bluetooth wireless local area network.

The series structure of the image data signal processor of the present embodiment is known as a "pipe line" architecture. This architectural configuration is presented as an illustrative embodiment, however other architectures can be used. For example, an image data signal processor with a "parallel architecture", in which one or more image data signal processing circuits are arranged to receive processed image data signals from a plurality of image data signal processing circuits, rather than after they have been processed serially by all preceding image data signal processing circuits, can be employed. A combination of a partial parallel and a partial pipeline architecture is also a possibility.

The series of image data signal processing circuits of Image Data Processor 125 is called an "image processing pipe". The present invention adds Image Coloration Artifact Processing Circuit 160 to those routinely included in the image processing pipe of a digital camera or image capture device. In this embodiment, Circuit 160 is shown as an independent element that reads as input through line 123, 2 or more processed images from Image Storage Module 104, and generates a reduced coloration artifact image. This image is stored in Image Storage Module 104, through line 134. This configuration has been chosen to isolate the coloration artifact reduction process, and thus facilitate explanation. A version of Image Coloration Artifact Processing Circuit 160 could also be placed before Image Data Signal Processing Circuit 155 and be configured to operate on captured images at prior stages of image processing.

Image data signal processing circuits routinely included in the image processing pipe of a digital camera, all well know by those skilled in the art, include circuits that perform White Balance Correction (WBC), Lens Shading Correction (LSC), Gamma Correction (GC), Color Transformations (CTM), Dynamic Range Compression (DRC), Demosaicing, Noise Reduction (NR), Edge Enhancement (EE), Scaling, and Lens Distortion Correction (LDC). The combined functionality provided by these circuits serve to generate the 2 or more processed images stored in image Storage Module 104 that the present invention employs to create a reduced coloration artifact Image.

In the first embodiment of the present invention, shown in FIG. 1, Camera Controller 165, through Control/Status lines 170, causes Flash Lamp 108 or Flash Lamp 114 to illuminate a scene, and Electronic Shutter 180, Electronic Iris 185, Image Sensor 110, Analog Amplifier 115, and Analog to Digital converter 120, to capture and convert to digital image data, a series of flash illuminated images of the scene. In the following description the series comprises a first and a second image. However, as will be later discussed, the capture of additional images may be of benefit when certain subjects are present in the scene. In order to reduce artifacts caused by movement of subjects in the scene, the time between the capture of the first image and the capture of the second image is preferably as short as possible. Modern digital cameras can execute the "flash illumination-picture capture-image processing-image storage cycle" in under 0.5 seconds. Residual motion artifacts can thereafter be mitigated by the use of well known image registration techniques.

In this first embodiment the first image is captured using an illumination source that emits light energy with wavelengths from either or both the green and blue portions of the visible spectrum. Wavelengths between 380 nm and 570 nm can be employed. Preferably wavelengths from the blue portion of the visible spectrum are used. Therefore, this illumination source preferably emits light whose spectral bandwidth is between 380 nm and 495 nm. Light with spectral bandwidths between 495 nm and 570 nm, green light, as well as between 380 nm and 570 nm, blue and green light, can also be employed. The benefit of using blue light is that the retinas of human subjects, or dog, cat or other pet subjects, most often do not reflect blue light, so that the pupils of these subjects will appear black in the first image. If green light is used, human pupils will appear black in color, for human retinas do not reflect green light. However, some pets, whose retinas reflect light in the green and yellow portions of the visible spectrum, will appear with pupils that are bright. Therefore, if green light alone, or a combination of blue and green light is used, pet pupils in the first image may not be black in color, as is needed to mitigate coloration artifacts precipitated by the use of flash illumination.

The second image of this first embodiment is captured using an illumination source that emits white light. In other words it emits light energy with wavelengths from the red, green and blue portions of the visible spectrum. Wavelengths between 380 nm and 750 nm, including wavelengths between 570 nm and 750 nm are therefore employed. When using light from the entire visible light spectrum to illuminate the scene being captured, the retinas of human, and dog, cat or other pet subjects, reflect light of various wavelengths, so in the second image the pupils of these subjects may erroneously appear red, in the case of humans, yellow in the case of dogs, green in the case of cats, or some other color resulting from the combined reflection of a plurality of light wavelengths. By replacing pixels in the second image with their counterpart pixels from the first image these coloration artifacts can be greatly reduced, as will be described later in detail.

The first flash light source used to capture the first image can be comprised of one or more Light Emitting Diodes or LEDS, where the individual LEDS all emit light energy with the same wavelength. LEDs that emit light of different wavelengths can also be used as long as the combined radiant energy contains light energy whose wavelengths fall into the 380 nm to 570 nm range. The flash light source used to capture the first image can also be comprised of one or more gas discharge lamps whose light passes through one or more spectrally selective filters that only pass light energy in the 380 nm to 570 nm range. Likewise, the first light source can be comprised of one or more broad spectrum LEDs, that is white LEDs, whose light passes through one or more spectrally selective filters that only pass light energy in the 380 nm to 570 nm range.

Similarly, the second flash light source used to capture the second image can be comprised of one or more Light Emitting Diodes or LEDs. Individual LEDs may emit broad spectrum white light, or light with different spectral content whose combined radiant energy falls into the red, green and blue portions of the visible spectrum. Therefore, the combined spectral energy emitted from the LEDS of the second flash light source contains at least 3 wavelengths of light, one in the red, one in the green and one in the blue portions of the visible spectrum, where these wavelengths fall in the 570 nm to 750 nm, 495 nm to 570 nm and 380 nm to 495 nm ranges respectively. The flash light source used to capture the second image can also be comprised of one or more broad spectrum gas discharge lamps. Such gas discharge lamps emit white light with spectral energy in all portions of the visible spectrum.

The present invention can employ a hybrid LED/gas discharge illumination approach, where a gas discharge flash light illumination source is used to provide the broad spectral bandwidth light energy needed for the capture of the second image, while an LED flash light source is used to provide the limited spectral bandwidth light energy required for the capture of the first image. Additionally, a hybrid LED/gas discharge illumination approach can be employed where a white LED flash light illumination source is used to provide the broad spectral bandwidth light energy needed for the capture of the second image, while an optically filtered gas discharge flash light source is used to provide the limited spectral bandwidth light energy required for the capture of the first image.

Although the above description of the first embodiment of the present invention incorporates LED and/or gas discharge types of flash light sources, flash light sources based on other illumination technologies can be used to provide the illumination needed to capture the first and second image. For example, flash light sources that employ fluorescent lamps or electroluminescent panels could possibly be used. Thus, the present invention is not limited to the use of LED or gas discharge type flash light sources.

As previously mentioned, the capture of more than 2 images may be of benefit when certain subjects are present in the scene being acquired. Each of these additional images would be illuminated with light energy of a specific spectral bandwidth. In FIG. 1, flash lamp 112 represents the additional specific spectral bandwidth light sources. When the retinas of subjects in the scene undesirably reflect light from the first flash light source, additional images can be captured using light with spectral bandwidths that are not reflected. The need to capture additional images may occur if, for example, the first flash light source emits light energy in the blue region of the visible spectrum and an animal is present in the scene being acquired whose retinas reflect wavelengths of light present in the first flash light source's blue light output. In this case, a third image can be captured using illumination that resides in the in the green region of the visible spectrum or a different portion of the blue region of the visible spectrum that does not contain the problematic wavelengths of light energy. The 3 images could be combined, as will be later discussed, in order to effect coloration artifact reduction.

As shown in FIG. 1, the digital image data from Analog to Digital converter 120, is input to Image Data Signal Processor 125 through line 130. Image Signal Processor 125 processes the data into a series of flash illuminated images of the scene through the use of Image Data Signal Processing Circuits 140, 145 and 155. Additional Image Data Signal Processing Circuits included in the image data signal processing pipeline are represented in FIG. 1 as the ellipses labeled 150. Before the coloration artifact reduction of the present invention is effected by Image Coloration Artifact Reduction Circuit 160, these images are stored in Image Storage 104 by Image Data Signal Processing Circuit 155 through line 119, and can be input to Image Display 106 for viewing from Image Data Signal Processing Circuit 155 through line 117. Image Data Storage 104 can also store partially processed digital image data generated by various Image Data Signal Processing Circuits of Image Data Signal Processor 125. Such partially processed data is input to and output from Image Data Storage 104 through line 132.

Figure 4:
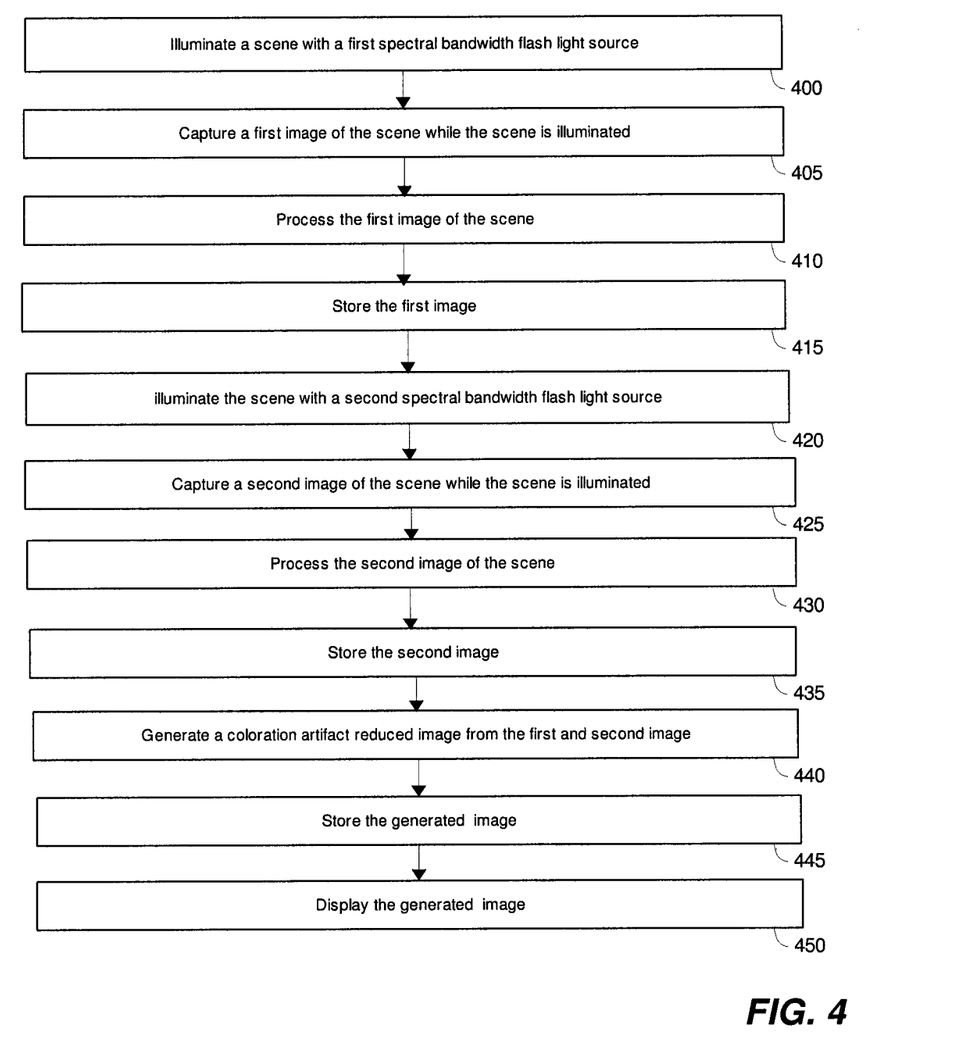
FIG. 4 is a flow chart illustrating the image capture and processing sequence of a first embodiment of the present invention.

FIG. 4 is a flow chart illustrating the image capture and processing sequence of the first embodiment of the present invention. In Block 400 a scene is illuminated with a first spectral bandwidth flash light source. In Block 405 a first image of the scene is captured while the scene is illuminated by the first spectral bandwidth flashlight source. Following first image capture, the first image data is processed and stored. This is depicted in Blocks 410 and 415 respectively. At this point, a second image of the scene, illuminated with a second spectral bandwidth flash light source, is captured.

This is shown in Blocks 420 and 425. The second image data is processed and stored, as indicated in Blocks 430 and 435. In Block 440 coloration artifact reduced image data is generated from first and second image data. The generated image data is stored in Block 445 and subsequently displayed in Block 450.

Figure 3:
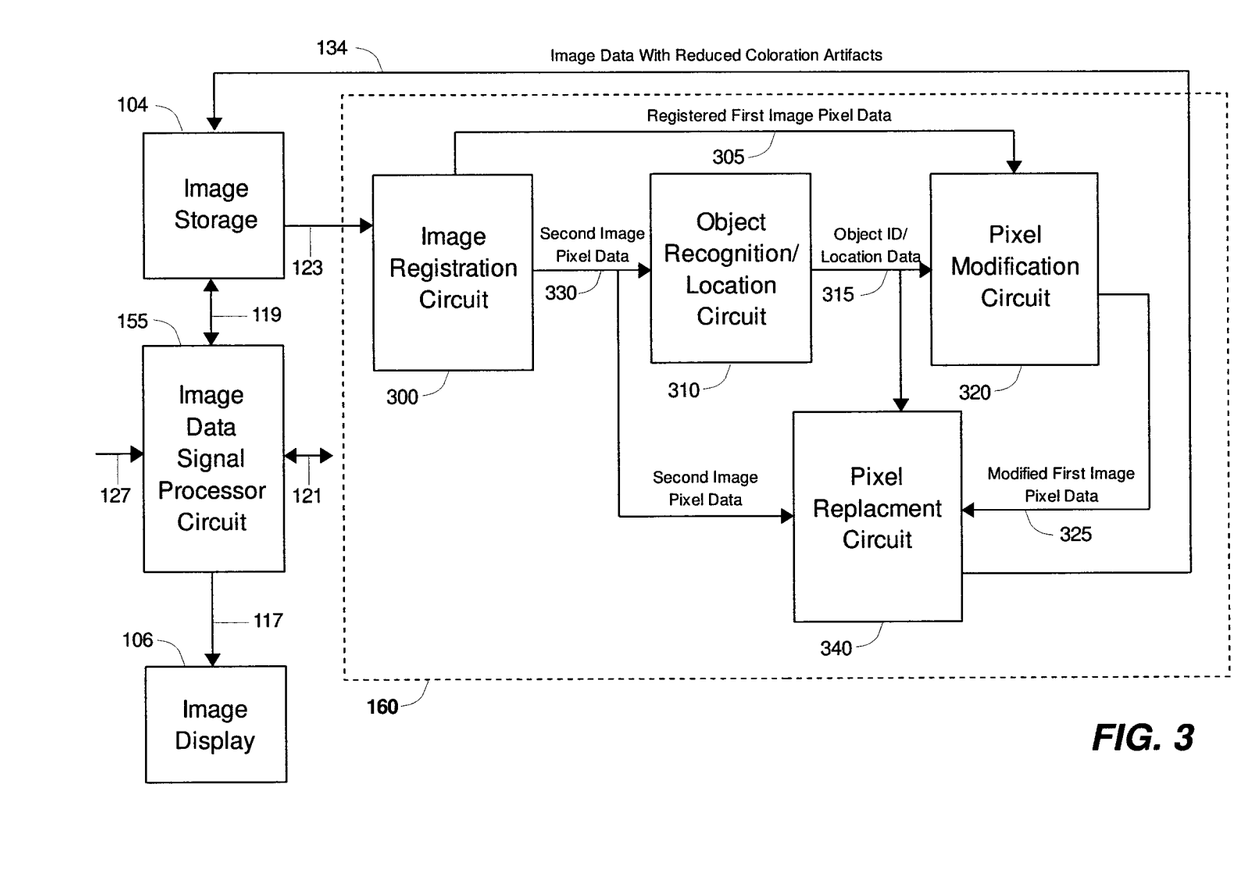
FIG. 3 is a block diagram of a coloration artifact image processor of the present invention.

FIG. 3 depicts a detailed block diagram of Image Coloration Artifact Reduction Circuit 160. First and second image data stored in Data Storage 104 are input to Coloration Artifact Reduction Circuit 160 over line 123 for coloration artifact reduction. A combined image with reduce coloration artifacts is output from Coloration Artifact Reduction Circuit 160 to Image Data Storage 104 over line 134. Line 121 is used by Image Data Signal Processing Circuit 155 to signal Coloration Artifact Reduction Circuit 160 that first and second image data are ready for processing. Line 121 is also used by Circuit 160 to signal Circuit 155 that a combined coloration artifact reduced image is in Data Storage 104 and is available for display. Image Registration Circuit 300 of Coloration Artifact Reduction Circuit 160 receives first and second image data when it is available and employs well know registration techniques to register, at the image pixel level, the first image to the second image. Before performing image registration, the registration process of Circuit 300 reduces the affect of camera and scene object displacement that may have occurred between the capture of the first and second image by warping the first image so that it better aligns with the second image. Image Registration Circuit 300, in general, employs the second image, or in the case of a series of 3 or more images, the last image captured, as the reference image, to which the first image, and all additional captured images, are pixel to pixel registered. However, any image in the series can be used a the reference image. A number of techniques can be used for image alignment and registration. A good example is described in "High Dynamic Range Video", S. B. Kang, M. Uyttendaele, S. Winder, and R. Szeliski, Interactive Visual Media Group, Microsoft Research, Redmond, Wash., 2003. The approach described handles both camera movement and object movement in a scene. For each pixel a motion vector is computed between successive series images. This motion vector is then refined with additional techniques, such as hierarchical homography, to handle degenerate cases. Once the motion of each each pixel is determined, frames are warped and registered with the second image.

After Image Registration Circuit 300 registers the first image to the second image, the registered first image data and the reference second image data signals are output on lines 305 and 330, respectively. Second image data is input to Object Recognition/Location Circuit 310 and Pixel Replacement Circuit 340 on line 330. Registered first image data is input to Pixel Modification Circuit 320 on line 305. Using second image data, Circuit 310 identifies the scene objects in which groups of scene pixels reside and the location of these objects in the image. For example, the pupil objects of living beings may be identified. Such living beings may include human subjects, canine subjects or feline subjects, among others. The present invention employs well known image recognition and location techniques to effect this identification. One such technique is described in Zoran Corporation published patent application US20090161964, "Detecting Objects In An Image Being Acquired By A Digital Camera Or Other Electronic Image Acquisition Device", Inventors Meir Tzur, et. al, published Jun. 25, 2009. Object identification and location data is output from Circuit 310 on line 315 to Pixel Modification Circuit 320 and Pixel Replacement Circuit 340. Using registered first image pixel data input on line 305, and object identification and location data input on line 315, Pixel Modification Circuit 320 modifies first image pixels based on the identity and location of the scene object in which they reside. One modification of first image pixels is the assignment of new chroma values to the pixels. A second is the conversion of the pixel's color luminance values to their equivalent gray scale luminance values. A way to convert a color luminance value to a gray scale representation of its luminance value is to obtain the values of the color's red, green, and blue (RGB) primaries in linear intensity encoding space, and then add together 30% of the red value, 59% of the green value, and 11% of the blue value. These weights are the ones typically used, but others can be employed depending on the choice of the RGB primaries. In the case of pixel chroma component conversion to gray scale representation, only the pixel's gray scale luminance value is preserved, the chroma component is removed. During this process the pixel's gray scale luminance value could additionally be modified. Such pixel modifications could be effected by Pixel Modification Circuit 320 in response, for example, to the identity of the scene object in which the first image pixels reside. For example, if the scene object is identified as the pupil of a living being, such as a human, canine or feline subject, the color luminance values of the first image pixels that reside in the living being's pupil areas may be converted to their equivalent gray scale luminance values. As an example, in the first embodiment of the present invention the first image is preferably, but not necessarily, captured with the use of an illumination source that emits light energy with wavelengths preferably from the blue portion of the visible spectrum. The use of blue light causes retinal reflections from most living being's pupil areas to be low in amplitude and therefore substantially black in color. However, a low, but noticeable level of blue light may be reflected from these pupil areas, giving the pixels in the pupil area a blue cast. It is therefore beneficial to modify pupil areas pixels by converting the pixel's color luminance values to their equivalent gray scale luminance values and thereby removing residual blue chromaticity.

Another modification of first image pixels that can be effected by Pixel Modification Circuit 320 is the blending of first image pixels with surrounding pixels. Such blending could be part of a noise reduction process. One such a noise reduction process is described in Zoran Corporation published patent application US20080291330, "Advanced Noise Reduction In Digital Cameras", et. al, published Nov. 27, 2008. The use of a limited bandwidth illumination source, such as a source that emits light energy with wavelengths only from the blue portion of the visible spectrum, could add noise to first image pixels. The use of blending and noise reduction techniques can help mitigate this added noise.

Modified first image pixels are output from Pixel Modification Circuit 320 on line 325 and input to Pixel Replacement Circuit 340, second image pixel data is input to Circuit 340 from Image Registration Circuit 300 on line 330, and second image scene object identity and location data is input to Circuit 340 on line 315 from Object Recognition/Location Circuit 310. From these 3 inputs Pixel Replacement Circuit 340 generates output image pixel data with reduced image coloration artifacts by replacing second image pixels of the second image with selected, registered, counterpart first image pixels from the first image. The selection of the pixels replaced in the second image with modified registered first image pixels is based on the identity of the scene object in which they reside. For example, if the scene object is identified as the pupil of a living being, such as a human, canine or feline subject, there is a chance that the pixels that reside in this second image area may exhibit color artifacts. This is because the flash light source employed to capture the second image contains wavelengths from the red, green and blue portions of the visible spectrum, and the retina of the subject's eye may reflect portions of the flash light source's broad spectral content light energy. This can cause the subject's pupil to possibly appear bright and in a color other than black, where black is the expected color. By replacing these second image pixels with modified registered counterpart first image pixels captured with flash light in the blue portion of the visible spectrum, for example, the potential for pixel coloration and intensity artifacts to appear in the image data output on line 134, and be stored in Image Storage 104, is greatly diminished. This is because blue light most often does not reflect from the retinas of living beings.

Figure 6:
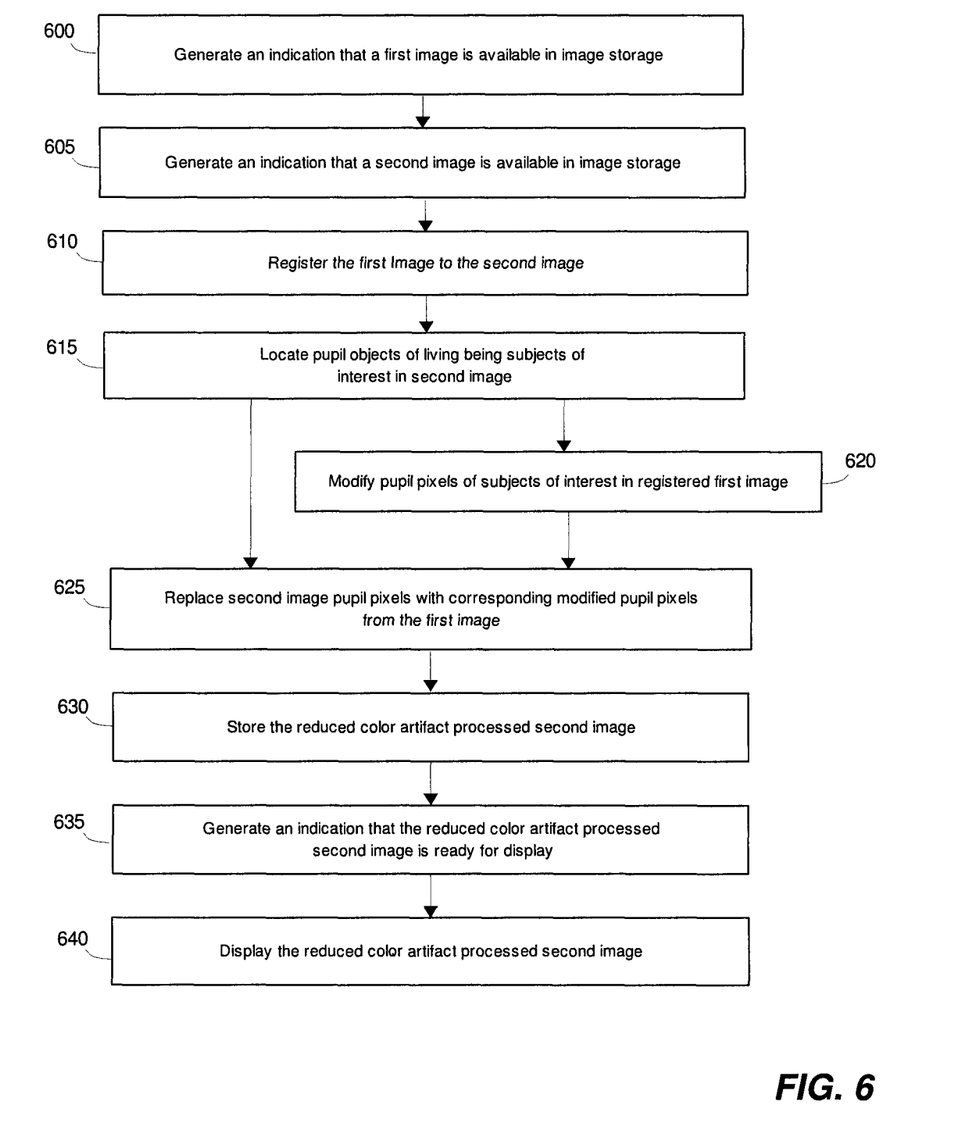
FIG. 6 is a flow chart illustrating a reduced coloration artifact image generation processing sequence of the present invention.

FIG. 6 is a flowchart illustrating a reduced coloration artifact image generation processing sequence of the present invention. In Blocks 600 and 605 indications are generated by an image processing module of an image capturing apparatus of the present invention, that a first image and a second image are available in image storage for image coloration artifact processing. For example, image data signal processing circuit 155 of FIGS. 1 and 2 could generate such indications. In Block 610 the first image is pixel by pixel registered to the second image. Following this registration process, in Block 615, pupil objects of living being subjects of interest, for example, are located in the second image. In Block 620, pupil pixels of subjects of interest in the registered first image are modified in a manner previously discussed. The locations of these registered first image pupil pixels are determined by the location of their corresponding pixels in the second image. In Block 625 second image pupil pixels are replaced with their corresponding modified first image pupil pixels. The resulting reduced coloration artifact second image is stored in Block 630, and an indication that it is ready for display is generated in Block 635. The reduced color artifact processed second image is subsequently displayed in Block 640.

Figure 2:
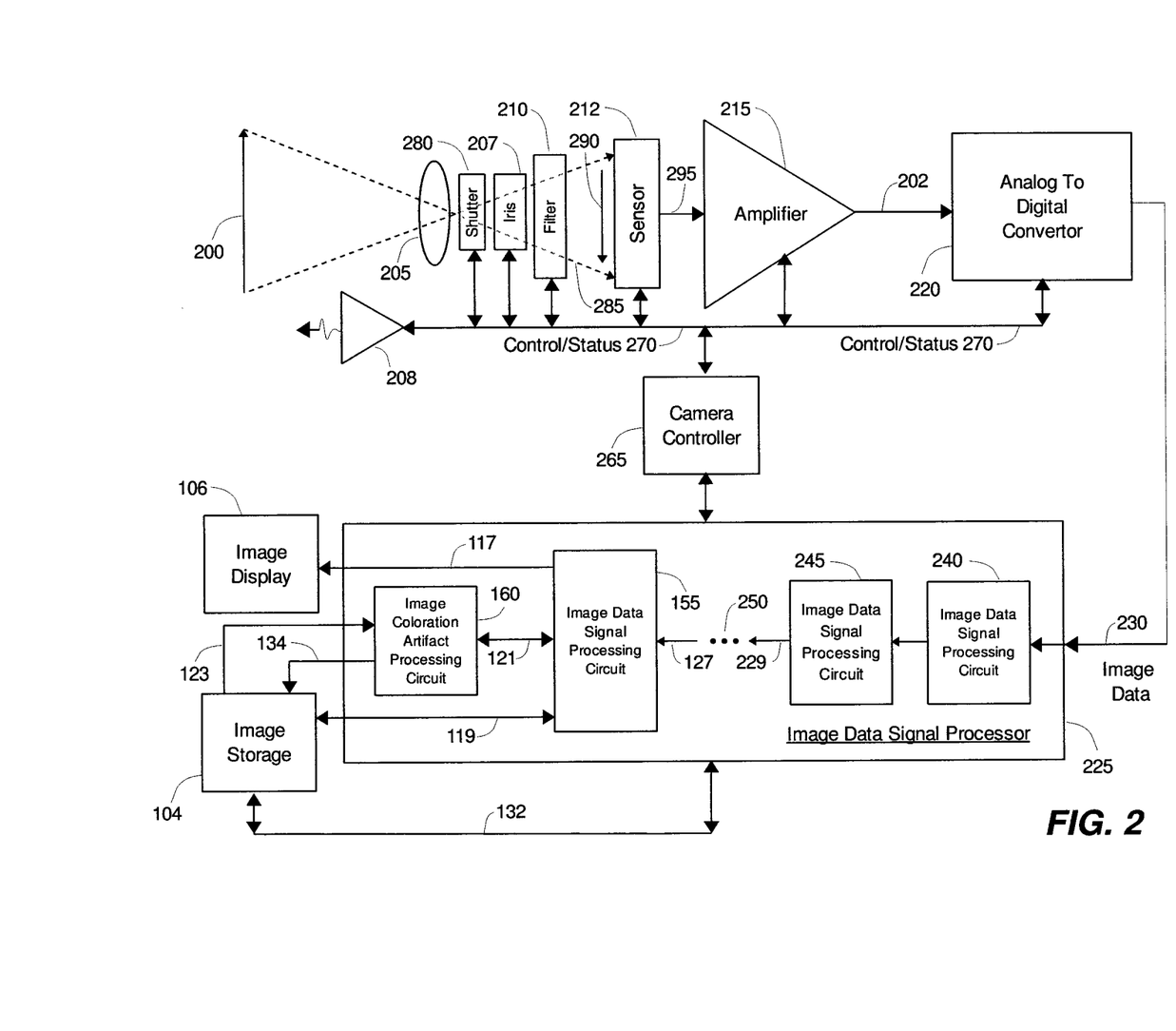
FIG. 2 is a block diagram of a digital camera or other image capture apparatus incorporating a second embodiment of the present invention.

FIG. 2 shows a second embodiment of the present invention. Unlike the first embodiment of the present invention, which captures a first image of a scene illuminated by a first spectral bandwidth flash light source with a narrow range of light energy wavelengths, and a second image of the scene illuminated by a second spectral bandwidth flash light source with a wide range of light energy wavelengths, the first and second image of the scene can be illuminated by the same wide spectral energy light source. Such a flash light source, depicted as block 208 in FIG. 2, contains wavelengths from all portions of the visible spectrum, that is wavelengths between 380 nm and 750 nm, including wavelengths between 570 nm and 750 nm in the red portion of the visible spectrum. In the case of this second embodiment, the first image is captured through a spectrally selective optical filter, while the second image of the scene is captured with the spectrally selective optical filter removed or disabled. The disabling of the spectrally selective optical filter causes light energy from all portions of the visible spectrum to be used for second image capture. This configuration allows the second embodiment of the present invention to employ a single flash illumination source, while using the same image processing elements for coloration artifact reduction as used by the first embodiment of the present invention, as shown in FIG. 3, to generate output image pixel data with reduced image coloration artifacts.

For capturing the first image of a scene containing human faces, the spectrally selective optical filter of the second embodiment can pass wavelengths between 380 nm and 570 nm, 495 nm and 570 nm, or 380 nm and 495 nm, and provide the spectral selectivity needed for reducing coloration artifacts that may be present. This is because an optical filter with these spectral bandpass characteristics will only pass light energy comprised of wavelengths in the blue and/or the green portions of the visible spectrum, and block light energy in the red portion of the visible spectrum. Since the retinas of the eyes of human subjects in the scene reflect red light, the pupils of the human subjects in the scene will appear to be black in color in the first image taken through the filter, and red in color in the second image taken with the filter disabled. By replacing the pupil pixels in the second image with those of the first image, the undesirable red retinal reflections that cause normally black human pupils to appear red can be effectively eliminated. However, for the capturing of images of dogs, cats and other pets, whose retinas reflect colors other than red, a different bandwidth spectrally selective filter may be of benefit. Since the retinas of human subjects, and dog, cat or other pet subjects, most often do not reflect blue light, a spectrally selective filter which only passes blue light may be more appropriate. The use of such a blue bandpass filter, that is a filter that passes light with wavelengths between 380 nm and 495 nm, will, in most cases, cause the pupils of all of these subjects to appear black in the first image, and allow coloration artifacts in the second image to be readily reduced.

There are a number of ways of disabling the spectrally selective optical filter of the second embodiment, shown as Filter 210 of FIG. 2. With reference to FIG. 2, one way is to mechanically move the position of Filter 210 such that light 285 from Scene 200 passing through Lens 205, Shutter 280, and Iris 207 does not pass through Filter 210 before impinging on Light Sensor 212, at the time the second image is captured. This can be effected by using a solenoid or small DC motor, actuated by Control line 270, to place Filter 210 in an adjacent horizontal position out of the path of Light 285 during the time the second image is being captured. It could also be effected by mounting a circular implementation of Filter 210 on the periphery of a disc, 180 degrees away from a hole in the periphery of the disc, the hole being the same diameter as Filter 210 and positioned at the same radial dimension as that of Filter 210. During the image capture process, this disc would be in constant rotation. The capture of the first image would be initiated by Control line 270 when Filter 210 fully intercepts Light 285. The capture of the second image would be initiated by Control line 270 when the hole in the disc is positioned such that Light 285 can pass through the hole and reach Light Sensor 212 unimpeded. Another approach is to employ an electrically tunable optical filter whose bandwidth can be modulated in response to Control line 270.

As further depicted in FIG. 2, the analog output of Light Sensor 212 of the second embodiment of the present invention, is input to Analog to Digital converter 220. Digital image data from Analog to Digital converter 120, is input to Image Data Signal Processor 225 through line 230. Image Signal Processor 225 processes the data into a series of flash illuminated images of the scene through the use of Image Data Signal Processing Circuits 240, 245 and 155. Additional Image Data Signal Processing Circuits included in the image data signal processing pipeline are represented in FIG. 2 as the ellipses labeled 250. Before the coloration artifact reduction of the present invention is effected by Image Coloration Artifact Reduction Circuit 160, these images are stored in Image Storage 104 by Image Data Signal Processing Circuit 155 through line 119, and can be input to Image Display 106 for viewing from Image Data Signal Processing Circuit 155 through line 117. Image Data Storage 104 can also store partially processed digital image data generated by various Image Data Signal Processing Circuits of Image Data Signal Processor 225. Such partially processed data is input to and output from Image Data Storage 104 through line 132.

Figure 5:
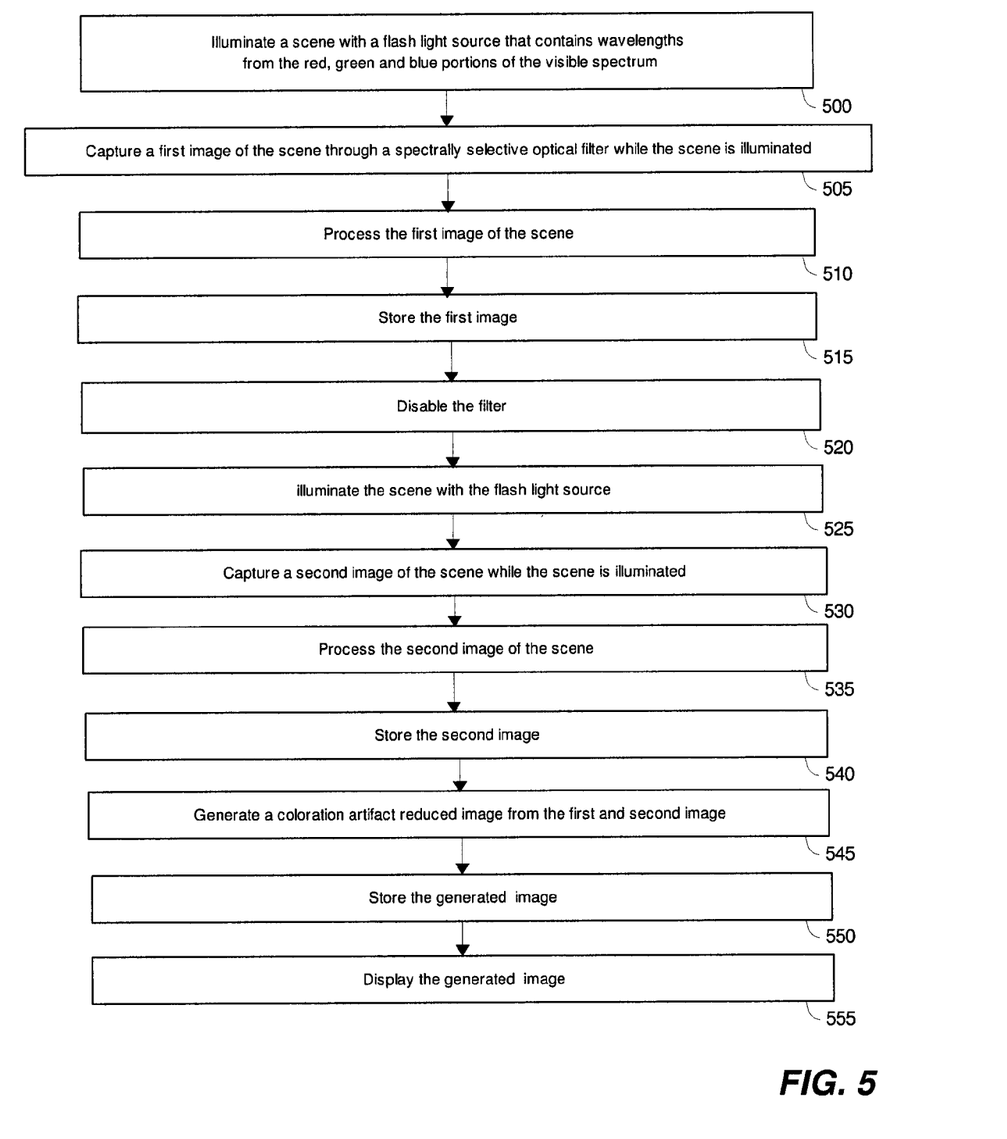
FIG. 5 is a flow chart illustrating the image capture and processing sequence of a second embodiment of the present invention.

FIG. 5 is a flow chart illustrating the image capture and processing sequence of the second embodiment of the present invention. In Block 500 a scene is illuminated with a flash light source that contains wavelengths from the red, green and blue portions of the visible spectrum. In Block 505 a first image of the scene is captured through a spectrally selective optical filter while the scene is illuminated by the flashlight source. Following first image capture, the first image data is processed and stored. This is depicted in Blocks 510 and 515. At this point, the spectrally selective optical filter is disabled, the scene is illuminated with the flash light source and a second image of the scene is captured. This is shown in Blocks 520, 525 and 530. The second image data is processed and stored, as indicated in Blocks 535 and 540. In Block 545 a coloration artifact reduced image is generated from first and second image data. The generated image data is stored in Block 550 and subsequently displayed in Block 555.

As previously mentioned, the second embodiment of the present invention, depicted in FIG. 2, and the first embodiment of the present invention, depicted in FIG. 1, both use the image processing elements depicted in FIG. 3 to effect coloration artifact reduction. Therefore, the block diagram of FIG. 3, and its description above, as well as the flow chart of FIG. 6 and its description above, apply to both embodiments.

Having thus described several aspects of preferred embodiments of the present invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only. Further, although the various aspects of the present invention have been described with respect to preferred embodiments thereof, it will be understood that the present invention is entitled to protection within the full scope of the appended claims.

What is claimed is:

1. A method comprising:
   capturing a first image of a scene, the first image formed of a first plurality of pixels, the first plurality of pixels having values that correspond to reflections of flash illumination within a predetermined spectrum of electromagnetic energy but that do not correspond to reflections of flash illumination within a portion of the predetermined spectrum;
   capturing a second image of the scene, the second image formed of a second plurality of pixels having values that correspond to reflections of flash illumination within the predetermined spectrum of electromagnetic energy including said portion of the predetermined spectrum; and
   correcting for a flash-induced coloration artifact in the second image by generating an output image in which only selected pixels of the second image are replaced with counterpart pixels from the first image.

2. The method of claim 1, wherein the predetermined spectrum includes the human-visible spectrum.

3. The method of claim 2, wherein said portion of the predetermined spectrum includes a red portion of the human-visible spectrum.

4. The method of claim 2, wherein said portion of the predetermined spectrum includes a red portion and a green portion of the human-visible spectrum.

5. The method of claim 2, wherein said portion of the predetermined spectrum includes a red portion and a blue portion of the human-visible spectrum.

6. The method of claim 1, wherein:
   the first image is captured while the scene is illuminated by a first spectral bandwidth flash light source; and
   the second image is captured while the scene is illuminated by a second spectral bandwidth flash light source; wherein the second spectral bandwidth flash light source contains wavelengths from red, green and blue portions of a human-visible spectrum and the first spectral bandwidth flash light source contains wavelengths from either or both the green and blue portions of the visible spectrum.

7. The method of claim 6 wherein the second spectral bandwidth flash light source emits light energy at wavelengths between 380 nm and 495 nm, at wavelengths between 495 nm and 570 nm, and at wavelengths between 570 nm and 750 nm.

8. The method of claim 7 wherein the first spectral bandwidth flash light source emits light energy at wavelengths between 380 nm and 495 nm, and emits substantially no light energy at wavelengths between approximately 495 nm and approximately 750 nm.

9. The method of claim 7 wherein the first spectral bandwidth flash light source emits light energy at wavelengths between 495 and 570 nm, and emits substantially no light energy at wavelengths between approximately 380 nm and approximately 495 nm and between approximately 570 nm and approximately 750 nm.

10. The method of claim 7 wherein the first spectral bandwidth flash light source emits light energy at wavelengths between 380 nm and 495 nm and at wavelengths between 495 nm and 570 nm, and emits substantially no light energy at wavelengths between approximately 570 nm and approximately 750 nm.

11. The method of claim 1, wherein capturing the first image of the scene comprises capturing the first image through a spectrally selective optical filter, the scene being illuminated by a flash light source that contains wavelengths from the red, green and blue portions of a human-visible spectrum; wherein the spectrally selective optical filter passes wavelengths from either or both the green and blue portions of the visible spectrum;
   the method further comprising disabling the filter prior to capturing the second image, wherein the second image is captured while the scene is illuminated by the flash light source.

12. The method of claim 11 wherein the flash light source emits light energy at wavelengths between 380 nm and 495 nm, at wavelengths between 495 nm and 570 nm, and at wavelengths between 570 nm and 750 nm.

13. The method of claim 12 wherein the spectrally selective optical filter filters out wavelengths between 570 nm and 750 nm.

14. The method of claim 12 wherein the spectrally selective optical filter filters out wavelengths between 495 nm and 570 nm and wavelengths between 570 nm and 750 nm.

15. The method of claim 12 wherein the spectrally selective optical filter filters out wavelengths between 380 nm and 495 nm and wavelengths between 570 nm and approximately 750 nm.

16. The method of claim 1 wherein the counterpart pixels are chosen based on the identity of a scene object in which they reside.

17. The method of claim 1 wherein characteristics of the counterpart pixels are modified before they are used to replace pixels of the second image.

18. The method of claim 17 wherein the counterpart pixels are modified by removing their chroma component.

19. The method of claim 17 wherein the counterpart pixels are modified by altering their amplitude value.

20. The method of claim 17 wherein the counterpart pixels are modified by assigning a new chroma value to their chroma component.

21. The method of claim 17 wherein the counterpart pixels are modified in response to the identity of the scene object in which the first image pixels reside.

22. The method of claim 17 wherein the counterpart pixels are modified by blending them with surrounding pixels.

23. An image capture apparatus comprising:
a optical lens;
a photo sensor;
a controller, coupled to the photo sensor, to capture a first image of a scene, the first image formed of a first plurality of pixels, the first plurality of pixels having values that correspond to reflections of flash illumination within a predetermined spectrum of electromagnetic energy but that do not correspond to reflections of flash illumination within a portion of the predetermined spectrum;
the controller further to capture a second image of the scene, the second image formed of a second plurality of pixels, the second plurality of pixels having values that correspond to reflections of flash illumination within the predetermined spectrum of electromagnetic energy including said portion of the predetermined spectrum; and
an image processor, coupled to the controller, to correct for a flash-induced coloration artifact in the second image by generating an output image in which only selected pixels of the second image are replaced with counterpart pixels from the first image.

24. The apparatus of claim 23, further comprising:
a first flash light source to produce illumination of a first bandwidth for capturing the first image of the scene; and
a second flash light source to produce illumination of a second bandwidth for capturing the second image of the scene;
wherein the controller is further to cause the first image of the scene to be captured by use of the first flash light source and to cause the second image of the scene to be captured by use of the second flash light source.

25. The apparatus of claim 24 wherein the second flash light source emits light energy at wavelengths between 380 nm and 495 nm, at wavelengths between 495 nm and 570 nm, and at wavelengths between 570 nm and 750 nm.

26. The apparatus of claim 25 wherein the first flash light source emits light energy at wavelengths between 380 nm and 495 nm, and emits substantially no light energy at wavelengths between approximately 495 nm and approximately 750 nm.

27. The apparatus of claim 25 wherein the first flash light source emits light energy at wavelengths between 495 and 570 nm, and emits substantially no light energy at wavelengths between approximately 380 nm and approximately 495 nm and between approximately 570 nm and approximately 750 nm.

28. The apparatus of claim 25 wherein the first flash light source emits light energy at wavelengths between 380 nm and 495 nm and at wavelengths between 495 nm and 570 nm, and emits substantially no light energy at wavelengths between approximately 570 nm and approximately 750 nm.

29. The apparatus of claim 23, further comprising:
a flash light source to illuminate the scene with light energy having wavelengths from the red, green and blue portions of a visible spectrum; and
a spectrally selective optical filter disposed in an optical path of the lens, the filter capable of being enabled and disabled, wherein the spectrally selective optical filter passes wavelengths from either or both the green and blue portions of the visible spectrum;
wherein the controller further is to cause the first image of the scene to be captured while the scene is illuminated by the flash light source and the spectrally selective optical filter is enabled, and to cause the second image of the scene to be captured while the scene is illuminated by the flash light source and the spectrally selective optical filter is disabled.

30. The apparatus of claim 29 wherein the flash light source emits light energy at wavelengths between 380 nm and 495 nm, at wavelengths between 495 nm and 570 nm, and at wavelengths between 570 nm and 750 nm.

31. The apparatus of claim 30 wherein the spectrally selective optical filter filters out wavelengths between 570 nm and 750 nm.

32. The apparatus of claim 30 wherein the spectrally selective optical filter filters out wavelengths between 495 nm and 570 nm and wavelengths between 570 nm and 750 nm.

33. The apparatus of claim 30 wherein the spectrally selective optical filter filters out wavelengths between 380 nm and 495 nm and wavelengths between 570 nm and approximately 750 nm.

34. The apparatus of claim 29 wherein the counterpart pixels are chosen based on the identity of a scene object in which they reside.

35. The apparatus of claim 23 wherein characteristics of the counterpart pixels are modified before they are used to replace pixels of the second image.

36. The apparatus of claim 35 wherein the counterpart pixels are modified by removing their chroma component.

37. The apparatus of claim 35 wherein the counterpart pixels are modified by altering their amplitude value.

38. The apparatus of claim 35 wherein the counterpart pixels are modified by assigning a new chroma value to their chroma component.

39. The apparatus of claim 35 wherein the counterpart pixels are modified in response to the identity of the scene object in which the first image pixels reside.

40. The apparatus of claim 35 wherein the counterpart pixels are modified by blending them with surrounding pixels.

41. An apparatus comprising:
means for capturing a first image of a scene, the first image formed of a first plurality of pixels, the first plurality of pixels having values that correspond to reflections of flash illumination within a predetermined spectrum of electromagnetic energy but that do not correspond to reflections of flash illumination within a portion of the predetermined spectrum;
means for capturing a second image of the scene, the second image formed of a second plurality of pixels having values that correspond to reflections of flash illumination within the predetermined spectrum of electromagnetic energy including said portion of the predetermined spectrum; and
means for correcting for a flash-induced coloration artifact in the second image by generating an output image in which only selected pixels of the second image are replaced with counterpart pixels from the first image.

* * * * *